United States Patent
Correll et al.

(10) Patent No.: US 9,558,099 B2
(45) Date of Patent: Jan. 31, 2017

(54) STAGED PROGRAM COMPILATION WITH AUTOMATED TIMING CLOSURE

(71) Applicant: NATIONAL INSTRUMENTS CORPORATION, Austin, TX (US)

(72) Inventors: Jeffrey N. Correll, Cedar Park, TX (US); Dustyn K. Blasig, Pflugerville, TX (US); Newton G. Petersen, Emporia, KS (US)

(73) Assignee: National Instruments Corporation, Austin, TX (US)

( * ) Notice: Subject to any disclaimer, the term of this patent is extended or adjusted under 35 U.S.C. 154(b) by 0 days.

(21) Appl. No.: 14/807,610

(22) Filed: Jul. 23, 2015

(65) Prior Publication Data

US 2015/0331679 A1    Nov. 19, 2015

Related U.S. Application Data

(63) Continuation of application No. 13/646,905, filed on Oct. 8, 2012, now Pat. No. 9,135,143.

(51) Int. Cl.
*G06F 17/50* (2006.01)
*G06F 11/36* (2006.01)
(Continued)

(52) U.S. Cl.
CPC .............. *G06F 11/362* (2013.01); *G06F 8/30* (2013.01); *G06F 8/34* (2013.01); *G06F 8/41* (2013.01)

(58) Field of Classification Search
CPC  G06F 17/5045; G06F 17/505; G06F 17/5031; G06F 17/5072; G06F 17/5022; G06F 11/362; G06F 11/3664; G06F 11/3636
See application file for complete search history.

(56) References Cited

U.S. PATENT DOCUMENTS

| 6,295,636 B1* | 9/2001 | Dupenloup | G06F 17/5045 716/103 |
| 6,378,123 B1* | 4/2002 | Dupenloup | G06F 17/5045 716/104 |

(Continued)

OTHER PUBLICATIONS

Martin et al., Constraint Programming Approach to Reconfigurable Processor Extension Generation and Application Compilation, Jun. 2012, 38 pages.*

(Continued)

*Primary Examiner* — Thuy Dao
(74) *Attorney, Agent, or Firm* — Meyertons Hood Kivlin Kowert & Goetzel, P.C.; Jeffrey C. Hood

(57) ABSTRACT

When compiling high-level, graphical code (e.g. Lab-VIEW™ code) to a different representation (e.g. different software code or hardware FPGA), information relating to characteristics of the design may be collected/captured from the compilation process, and automatically provided to all the earlier stages of the compilation process to obtain more optimal results. Without automated feedback of this information, users have to manually identify, produce, and provide the feedback information, or forego the process altogether, having to assume that the tool has produced the best possible results when that may not be the case. To correct timing, failed constraints paths may be parsed and compared to delays obtained during a previous compile, and previous adjustments that didn't yield desired results may be undone. The longest delay that didn't result from an undone path may then be identified, and adjusted, and the process may be repeated until all paths are predicted to pass.

22 Claims, 11 Drawing Sheets

(51) Int. Cl.
*G06F 9/45* (2006.01)
*G06F 9/44* (2006.01)

(56) References Cited

U.S. PATENT DOCUMENTS

| | | | |
|---|---|---|---|
| 6,539,536 B1* | 3/2003 | Singh | G06F 17/5045 |
| | | | 716/102 |
| 7,206,967 B1* | 4/2007 | Marti | G01R 31/31836 |
| | | | 714/25 |
| 7,254,789 B1* | 8/2007 | Fung | G06F 17/5031 |
| | | | 716/108 |
| 7,398,522 B2 | 7/2008 | Komatsu | |
| 7,594,208 B1* | 9/2009 | Borer | G06F 17/5045 |
| | | | 703/13 |
| 7,669,157 B1 | 2/2010 | Borer | |
| 7,730,464 B2 | 6/2010 | Trowbridge | |
| 7,788,657 B2 | 8/2010 | Wannamaker | |
| 7,840,954 B2 | 11/2010 | Gschwind | |
| 7,890,940 B2 | 2/2011 | Komatsu | |
| 8,230,406 B2 | 7/2012 | Carbone | |
| 8,281,274 B1* | 10/2012 | Padalia | G06F 17/5054 |
| | | | 716/116 |
| 8,327,316 B2 | 12/2012 | Chouinard | |
| 8,413,125 B2 | 4/2013 | Lee | |
| 8,418,095 B1 | 4/2013 | Neema | |
| 8,447,719 B2 | 5/2013 | Bethke | |
| 9,135,143 B2* | 9/2015 | Correll | G06F 8/34 |
| 2006/0015862 A1* | 1/2006 | Odom | G06F 9/4411 |
| | | | 717/168 |
| 2014/0165022 A1* | 6/2014 | Stevens | G06F 17/5031 |
| | | | 716/134 |

OTHER PUBLICATIONS

A. Chlipala, A verified compiler for an impure functional language, Jan. 2010, 14 pages.*
Sarangi et al.; "CADRE: Cycle-Accurate Deterministic Replay for Hardware Debugging;" International Conference on Dependable Systems and Networks, Jun. 25-28, 2006, DOI: 10.1109/DSN2006. 19; pp. 301-312.
"Synthesis and Simulation Design Guide: 10.1;" Xilinx, 2008, user guide retrieved May 28, 2013 from <http://www.xilinx.com/itp/xilinx10/books/docs/sim/sim.pdf> (pp. 1-218).

* cited by examiner

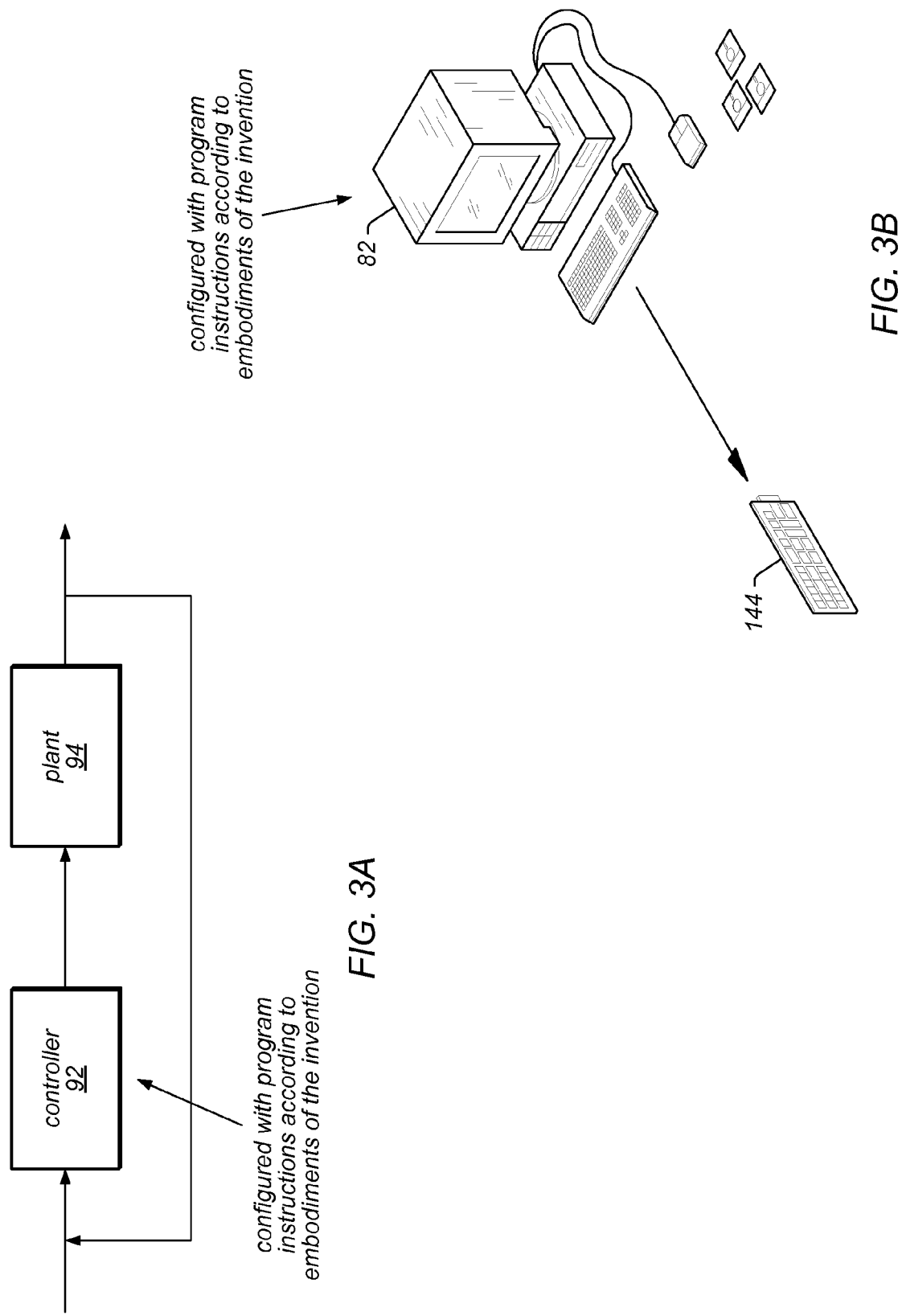

STAGED PROGRAM COMPILATION WITH AUTOMATED TIMING CLOSURE

PRIORITY DATA

This application is a continuation of U.S. application Ser. No. 13/646,905, titled "Automated Analysis of Compilation Processes in a Graphical Specification and Constraint Language", filed Oct. 8, 2012, whose inventors were Jeffrey N. Correll, Dustyn K. Blasig, and Newton G. Petersen, now issued as U.S. Pat. No. 9,135,143.

FIELD OF THE INVENTION

The present invention relates to the field of programming, and more particularly to a system and method for generating and debugging timing accurate simulations.

DESCRIPTION OF THE RELATED ART

Many industrial applications require high-performance and/or efficient implementation, such as digital signal processing (DSP) applications, for example. Moreover, such applications may be subject to various constraints, e.g., with respect to timing, resource usage, throughput, etc. For example, applications to be implemented in programmable hardware, such as a field programmable gate array (FPGA) may be subject to constraints regarding the application's footprint, i.e., area used, on the FPGA. Many high-performance applications are implemented in accordance with data flow (also referred to as "dataflow") protocols, which facilitate parallelism, particularly in hardware implementations, such as FPGA based targets.

The aforementioned applications implemented in programmable hardware may further be subject to timing and resource constraints with corresponding implications that are often difficult and/or impossible to predict when making choices while constructing high-level models and/or code representative of the applications. For example, such choices may need to be made when using high-level code, e.g. graphical code such as LabVIEW™, and compiling it to another code, which may be a hardware code eventually leading to a working FPGA implementation, for example. It is only well into the compile process (e.g. compiling for Xilinx) that the validity, correctness, or sufficiency of certain values that were specified when making those choices become evident. In general, the problem occurs anytime an internal or external tool is invoked to finish high-level compilation that started from the first tool. For example, LabVIEW™ may be used as the first tool, and the compilation process may invoke the Xilinx toolchain, but it may invoke any other toolchain depending on the target of the compilation process. Prior art techniques for specifying and implementing such applications therefore require significant manual analysis and testing, which is difficult, tedious, and error prone.

Thus, improved systems and methods for specifying and implementing applications are desired.

SUMMARY OF THE INVENTION

Various embodiments of a system and method for specifying and implementing applications and/or programs may use a compilation process in which the analysis of the output from various stages of the compile process, or compilation process is automated, thereby facilitating the modification of the design at the various different stages of the compilation process to account for deficiencies in prior passes of the compilation process (i.e. prior times of having performed the compile process on the same design). Specifically, various embodiments may use a novel method for compiling high-level, graphical code (e.g. LabVIEW™ code) to a working FPGA. More generally, various embodiments may use a novel method for compiling high-level code (which may be a graphical code) to heterogeneous sets of hardware, or to any other code. For example, an application may be automatically compiled to a mix of desktop (e.g. general purpose processor) and FPGA. In other embodiments, the application may be automatically compiled to some other code, which may itself be compiled to a working FPGA, general-purpose processor, or a mix of desktop and FPGA, and so forth. For example, a desktop algorithm may be analyzed to determine whether it meets certain specified requirements, e.g. timed loop timer constraints, and optimize the design at various stages of the compilation process according to analysis performed at those stages, to enhance future compilations of the desktop algorithm.

In one set of embodiments, real information from the compilation may be collected/captured and fed back or provided to earlier stages of the compile process to allow for the possibility of making different decisions to obtain a more optimal result. Without the feedback of such real information to earlier stages of the compilation process, a user may have to either manually identify and produce similar feedback information, and means of manually providing the information, or simply forego the process altogether and assume that the tool has produced the best possible results, when in fact that may not be the case.

In one embodiment, a graphical program development environment may be provided which includes a graphical specification and constraint language that allows specification of a model of computation and explicit declaration of constraints. A graphical program may be created in the graphical specification and constraint language in response to user input. The graphical program may include a specified model of computation, a plurality of interconnected functional blocks that visually indicate functionality of the graphical program in accordance with the specified model of computation, and graphically indicated specifications or constraints for at least one functional block of the functional blocks in the graphical program.

In one set of embodiments, once the different stages of a compile process, for example the different stages of the compilation of a high-level program (such as Labview™ graphical code, C code, C++ code, etc.) have completed, timing path information and resource usage information may be automatically fed back to any one or more of the stages of the compilation process in order to ascertain which commands to modify to affect transformations that lead to more optimal results during subsequent (next) compilation(s). That is, once the compilation process has taken the high-level code down to a low-level target specific code (register transfer level—RTL—code or some hardware description language—HDL—code), and successfully generated the end "application" (by compiling/synthesizing the target specific code to a corresponding hardware or FPGA implementation, for example), the information generated by each stage of the process may be captured and returned to higher stages in the process for use in generating higher quality code, as perceived by the user. It should also be noted, that the process need not necessarily culminate in some hardware or circuit application, it may be a software application or any similar end target to which the high-level code is compiled through multiple stages. Furthermore, the information returned back to the higher stages need not be limited to timing and area constraint information, which are but an example of the type of information that the compiler may analyze.

According to one set of embodiments, a system may include a processor and a memory medium, coupled to the processor, with the memory medium storing program instructions executable by a computer system to receive a program input representative of a design implementing one or more functions, and produce a target application or implementation of the design, e.g. a hardware implementation of the design by running the received program input through a compilation process that comprises multiple stages. As part of producing the target application of the design, (in this case the hardware implementation), the program instructions may be executable to collect information relating to characteristics of the design, for example timing and resource utilization for a hardware implementation, throughout the compilation process, provide respective portions of the collected information to each stage of the one or more stages of the multiple stages, and present a programming interface suitable to make adjustments to each stage of the one or more stages responsive to the respective portions of the collected information provided to each stage of the one or more stages.

The program instructions may also be executable to receive—through the programming interface—input instructions directed at modifying register placements for the purpose of adjusting timing paths, in order to improve the timing paths. The instructions may further be executable to receive input instructions directed at adding one or more registers along timing paths that failed timing requirements, in order to improve the timing paths. The program instructions may also be executable to produce a timing report resulting from the compilation process, compare the timing report with a prior timing report obtained from a previous compilation process through which the received program input was run, and adjust the timing paths in the design according to the results of the comparison. In one embodiment, the program instructions executable to compare the timing report with the prior timing report include program instructions executable to parse failed timing constraint paths in the timing report, and compare timing delays from the failed timing constraint paths to timing delays from corresponding timing constraint paths from the prior timing report. In addition, the program instructions executable to adjust the timing paths may include program instructions executable to undo previous timing adjustments that didn't produce desired results, according to the results of the comparison of the timing delays, identify a longest preexisting component delay from the failed timing constraint paths, and add a register in the timing path corresponding to the identified delay. Finally, the program instructions may be executable to predict new path lengths, and perform the correction of the longest preexisting component delays until all paths are predicted to pass.

Various embodiments may be specified to collect and return different types of information throughout the compilation process, depending on the design itself and the target application implementation of the design. The information may include characteristics of the design as relevant at the various different stages of the compile/compilation process, and the information may be then used to make modifications at the various different stages/levels of the compilation process to facilitate more efficient subsequent compilations of the same design.

BRIEF DESCRIPTION OF THE DRAWINGS

A better understanding of the present invention can be obtained when the following detailed description of the preferred embodiment is considered in conjunction with the following drawings, in which:

FIG. 3A is a high-level block diagram of an exemplary system which may execute or utilize graphical programs;

FIG. 3B illustrates an exemplary system which may perform control and/or simulation functions utilizing graphical programs;

Figure 1A:
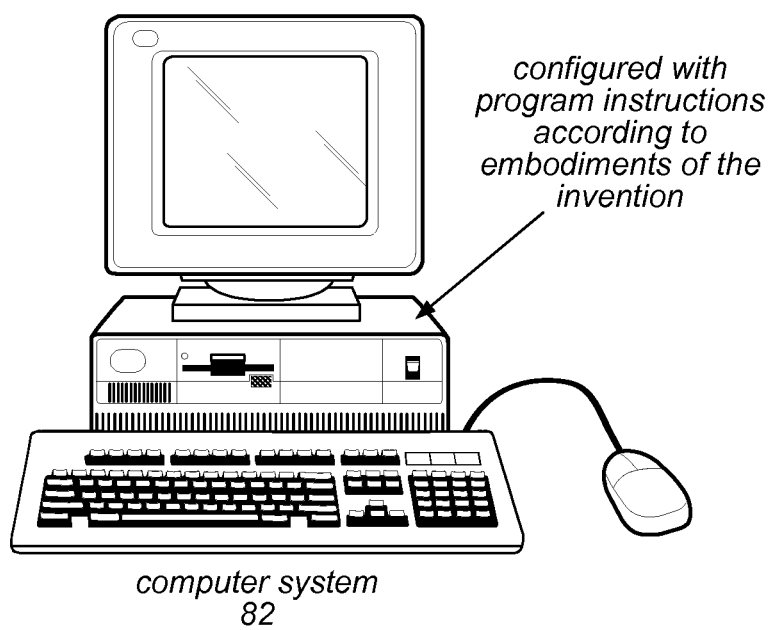
FIG. 1A illustrates a computer system configured to execute a graphical program according to an embodiment of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF THE INVENTION

Terms

The following is a glossary of terms used in the present application:

High-Level Synthesis—sometimes referred to as C synthesis, electronic system level (ESL) synthesis, algorithmic synthesis, or behavioral synthesis, is intended to refer to an automated design process that interprets an algorithmic description of a desired behavior and creates hardware that implements that behavior. The starting point of a high-level synthesis flow may be ANSI C/C++/SystemC code or the like. The code may be analyzed, architecturally constrained, and scheduled to create a register transfer level hardware design language (HDL), which may then be synthesized to the gate level by the use of a logic synthesis tool. Hardware design may be created at a variety of levels of abstraction. The commonly used levels of abstraction include gate level, register transfer level (RTL), and algorithmic level. High-level synthesis tools may handle the microarchitecture and transform untimed or partially timed functional code into fully timed RTL implementations, automatically creating cycle-by-cycle detail for hardware implementation. The (RTL) implementations may then be used directly in a conventional logic synthesis flow to create a gate-level implementation.

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look-up tables) to coarse grained (arithmetic logic units or processor cores). A programmable hardware element may also be referred to as "reconfigurable logic".

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Program—the term "program" is intended to have the full breadth of its ordinary meaning. The term "program" includes 1) a software program which may be stored in a memory and is executable by a processor or 2) a hardware configuration program useable for configuring a programmable hardware element.

Graphical Program—A program comprising a plurality of interconnected nodes or icons, wherein the plurality of interconnected nodes or icons visually indicate functionality of the program. The interconnected nodes or icons are graphical source code for the program. Graphical function nodes may also be referred to as functional blocks, or simply blocks.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW®, DasyLab™, DiaDem™ and Matrixx/SystemBuild™ from National Instruments, Simulink® from the MathWorks, VEE™ from Agilent, WiT™ from Coreco, Vision Program Manager™ from PPT Vision, SoftWIRE™ from Measurement Computing, Sanscript™ from Northwoods Software, Khoros™ from Khoral Research, SnapMaster™ from HEM Data, VisSim™ from Visual Solutions, ObjectBench™ by SES (Scientific and Engineering Software), and VisiDAQ™ from Advantech, among others.

The term "graphical program" includes models or block diagrams created in graphical modeling environments, wherein the model or block diagram comprises interconnected blocks (i.e., nodes) or icons that visually indicate operation of the model or block diagram; exemplary graphical modeling environments include Simulink®, SystemBuild™, VisSim™, Hypersignal Block Diagram™, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected blocks or nodes is often referred to as the block diagram portion of the graphical program.

Node—In the context of a graphical program, an element that may be included in a graphical program. The graphical program nodes (or simply nodes) in a graphical program may also be referred to as blocks. A node may have an associated icon that represents the node in the graphical program, as well as underlying code and/or data that implements the functionality of the node. Exemplary nodes (or blocks) include function nodes, sub-program nodes, terminal nodes, structure nodes, etc. Nodes may be connected together in a graphical program by connection icons or wires.

Data Flow Program—A Software Program in which the program architecture is that of a directed graph specifying the flow of data through the program, and thus functions execute whenever the necessary input data are available. Data flow programs can be contrasted with procedural programs, which specify an execution flow of computations to be performed. As used herein "data flow" or "data flow programs" refer to "dynamically-scheduled data flow" and/or "statically-defined data flow".

Graphical Data Flow Program (or Graphical Data Flow Diagram)—A Graphical Program which is also a Data Flow Program. A Graphical Data Flow Program comprises a plurality of interconnected nodes (blocks), wherein at least a subset of the connections among the nodes visually indicate that data produced by one node is used by another node. A LabVIEW VI is one example of a graphical data flow program. A Simulink block diagram is another example of a graphical data flow program.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. An input control displays the value input by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are configured to acquire and/or store data. A measurement device may also optionally be further configured to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further configured to perform control functions, e.g., in response to analysis of the acquired or stored data. For example, the measurement device may send a control signal to an external system, such as a motion control system or to a sensor, in response to particular data. A measurement device may also be configured to perform automation functions, i.e., may receive and analyze data, and issue automation control signals in response.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are automatically completed). The present specification provides various examples of operations being automatically performed in response to actions the user has taken.

Disciplined Design Methodology—refers to a design methodology where there is a clear and formal definition of the application specifications and constraints, the platform resources and capabilities, and the quantitative and qualitative interactions between the application specifications and constraints and the platform resources and capabilities models, so that a system/computer can automatically perform operations to navigate the design space, or can aid the user (via a wizard or expert system) to navigate the design space manually.

Application Model—a clear and formal definition of the specifications and constraints of the user application.

Platform Model—a clear and formal definition of the computing and I/O resources and capabilities of the user selected target platform.

Resource Model—an internal model that stores actor definitions (e.g., via tuples) and actor interconnect information, and is an intermediate representation on which code generation may be based.

Platform Library—a library of pre-characterized platform building blocks that the user can assemble to create a platform model. This library can include timing data for blocks.

Specification—refers to part of the diagram or user input that captures the application functionality and reflects the user intent irrespective of the platform on which the application is going to be implemented/deployed.

Constraint—refers to part of the diagram or user input that captures implementation specific user intentions, i.e., those specific to the platform on which the application is going to be implemented/deployed.

Actor—basic (software) unit of computation in a model; conceptually, a sequential process that reads inputs, executes, and produces outputs. An example of an actor is a functional block in a graphical program.

Channel—unbounded point-to-point FIFO buffers between actors.

Production/Consumption Count—the number of data tokens produced/consumed by an actor on a terminal per firing.

Firing—a single execution of an actor that begins when the requisite number of data tokens are present on all its input terminals and the requisite number of empty spaces (storage) are present on all its output terminals. On each firing, an actor consumes data from its input terminals, takes finite time to execute, and produces data on its output terminals.

Static Data Flow (SDF) Actor—an actor for which the number of data tokens consumed and produced by the actor firing on all its terminals is static and specified a priori at edit or compile time.

Cyclo-static Data Flow (CSDF) Actor—an actor which executes as a repeating sequence of phases. Each phase corresponds to a firing of a static dataflow actor for which the number of data tokens consumed and produced are specified a priori.

Parameterized Cyclo-Static Data Flow (PCSDF) Actor—a CSDF actor for which data production and consumption counts and execution behavior are regulated by parameters. The parameter values may be defined at the time the actors or functional blocks are connected together (static), or at run-time (dynamic). In the case of dynamic parameters, these usually determine some modes of operation of the functional blocks or the resulting graphical program. The parameters assume values from a finite set, and are updated only at iteration boundaries.

Heterochronous Data Flow (HDF)—a hierarchical model of Cyclo-Static Data Flow (CSDF) and Finite State Machine (FSM) actors. This model enables a decoupling of control and concurrency. The operational semantics require that state transitions are executed only at iteration boundaries of the SDF model.

Parameterized HDF (PHDF)—a parameterized version of HDF in which actor data production and consumption counts and execution behavior are regulated by parameters (see PCSDF actor definition above). HDF is often defined to include parameterization, and so the designation PHDF is used herein when that specific characteristic is being highlighted.

Parameterized Block—an actor or block (e.g., a functional block) that accepts parameters in the context of PCSDF, or HDF/PHDF.

Schedule—a sequence of actor firings that respects data dependencies and token counts (infinite or periodic).

Iteration—a finite sequence of actor firings that forms a single period of a periodic schedule.

Iteration boundary—the points where an iteration starts or stops.

Deterministic Execution—refers to a type of execution in which any implementation of the application, sequential or concurrent, on any platform, produces the same result.

Deadlock Free Execution—refers to a type of execution in which any implementation of the application does not terminate.

Bounded Execution—refers to a type of execution in which any implementation of the application executes in bounded memory.

Actor Worst Case Execution Time (WCET)—time to complete one actor firing (typical units are cycles or seconds).

Actor Initiation Interval (II)—minimum time between the start of successive actor firings (typical units are cycles or seconds).

Throughput—the number of tokens produced or consumed on a specified port or terminal per unit time (typical units are samples per second or samples per cycle).

Latency (End-To-End)—the time to complete one iteration of the model (typical units are cycles or seconds).

Latency (Computation Path)—the time elapsed along a specific computation path (typical units are cycles or seconds).

Mode—a phase of a functional block's execution (as in CSDF), or a state (or value) of a specification or constraint of a functional block that is configurable at runtime (as in dynamic PCSDF).

Clumping—an optimization method by which FIFO buffers between blocks (which serve as a harnessing boundary) may be removed and replaced with another implementation, e.g., a simple wire, a register, or a combination of FIFO and registers.

Backpressure-less implementation—an implementation style that does not require a downstream actor (e.g., functional block) to control data flowing from upstream actors based on its ability to process data.

Configuration Scope—the set of possible configurations for a configurable functional block, any of its terminals, specifications or constraints. For example, a parameter is defined by a configuration scope for a given parameter port or terminal.

FIG. 1A—Computer System

FIG. 1A illustrates a computer system 82 configured to implement various embodiments of the present invention. Various embodiments of methods for creating a program are described below.

As shown in FIG. 1A, the computer system 82 may include a display device configured to display one or more programs as they are created and/or executed. The display device may also be configured to display a graphical user interface or front panel of the program(s) during execution. The graphical user interface may comprise any type of graphical user interface, e.g., depending on the computing platform.

The computer system 82 may include at least one memory medium on which one or more computer programs or software components according to one embodiment of the present invention may be stored. For example, the memory medium may store one or more graphical programs or software tools which are executable to perform the methods described herein. Additionally, the memory medium may store a graphical programming development environment application used to create and/or execute such graphical programs. The memory medium may also store operating system software, as well as other software for operation of the computer system. Various embodiments further include receiving or storing instructions and/or data implemented in accordance with the foregoing description upon a carrier medium.

Figure 1B:
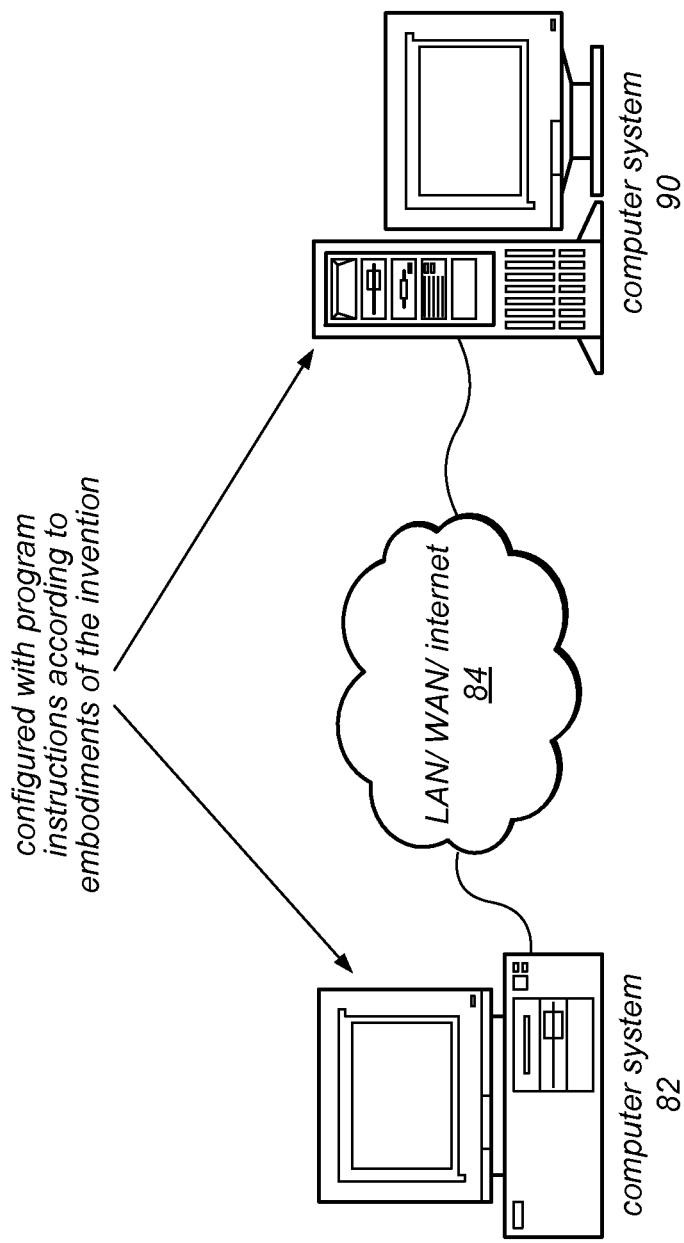
FIG. 1B illustrates a network system comprising two or more computer systems that may implement an embodiment of the present invention.

FIG. 1B—Computer Network

FIG. 1B illustrates a system including a first computer system 82 that is coupled to a second computer system 90. The computer system 82 may be coupled via a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. The computer systems 82 and 90 may execute a program in a distributed fashion. For example, computer 82 may execute a first portion of the block diagram of a graphical program and computer system 90 may execute a second portion of the block diagram of the graphical program. As another example, computer 82 may display the graphical user interface of a graphical program and computer system 90 may execute the block diagram of the graphical program.

In one embodiment, the graphical user interface of the graphical program may be displayed on a display device of the computer system 82, and the block diagram may execute on a device coupled to the computer system 82. The device may include a programmable hardware element and/or may include a processor and memory medium which may execute a real-time operating system (RTOS). In one embodiment, the graphical program may be downloaded and executed on the device. For example, an application development environment with which the graphical program is associated may provide support for downloading a graphical program for execution on the device in a real-time system.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, digital signal processing, etc. Exemplary test applications where the graphical program may be used include hardware-in-the-loop testing and rapid control prototyping, among others.

However, it is noted that embodiments of the present invention can be used for a number of different applications, and are not limited to the above applications. In other words, applications discussed in the present description are exemplary only, and embodiments of the present invention may be used in any of various types of systems. Thus, embodiments of the system and method of the present invention is configured to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Figure 2A:
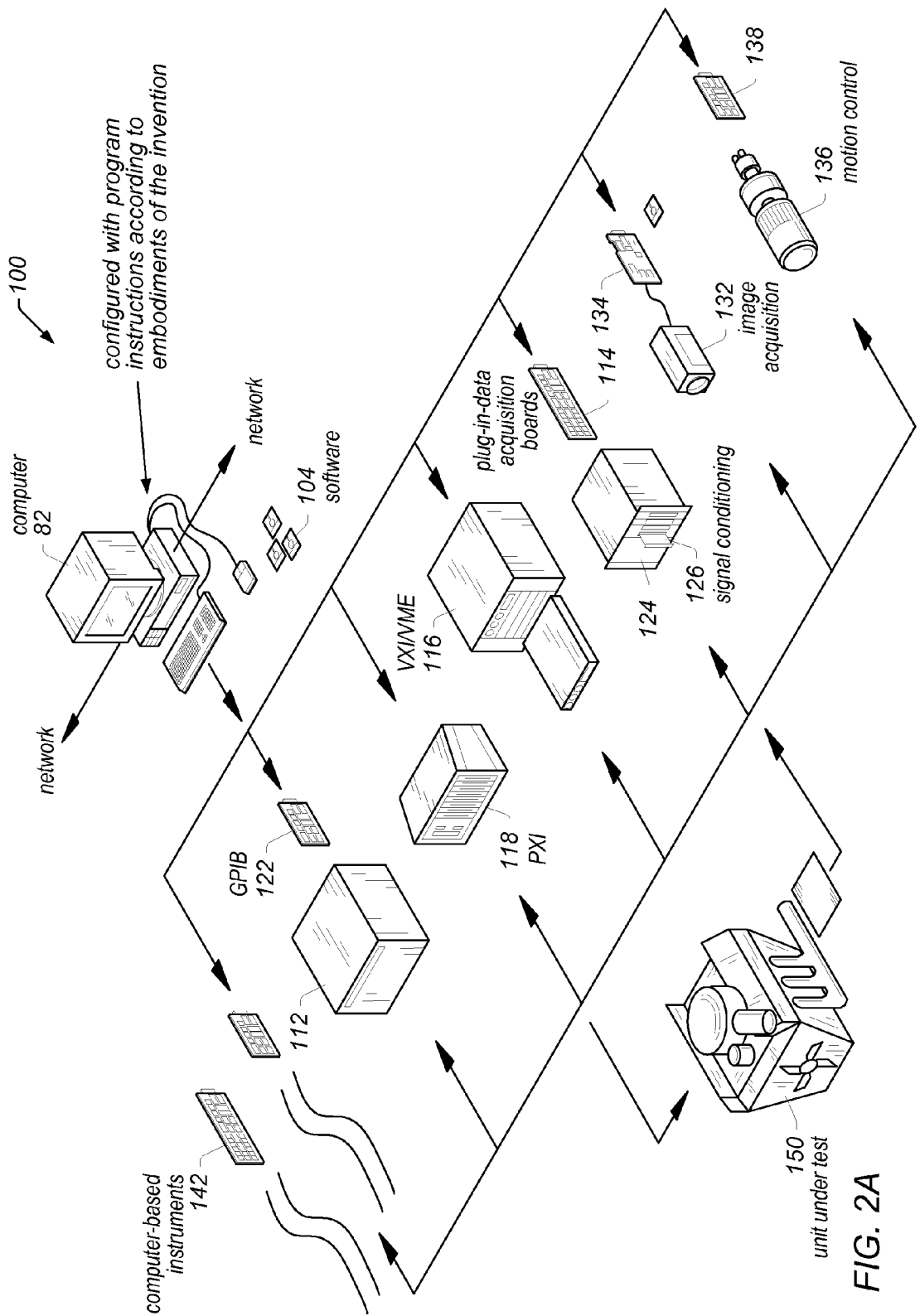
FIG. 2A illustrates an instrumentation control system according to one embodiment of the invention.

FIG. 2A illustrates an exemplary instrumentation control system 100 which may implement embodiments of the invention. The system 100 comprises a host computer 82, which couples to one or more instruments. The host computer 82 may comprise a CPU, a display screen, memory, and one or more input devices such as a mouse or keyboard as shown. The computer 82 may operate with the one or more instruments to analyze, measure, or control a unit under test (UUT) or process 150.

The one or more instruments may include a GPIB instrument 112 and associated GPIB interface card 122, a data acquisition board 114 inserted into or otherwise coupled with chassis 124 with associated signal conditioning circuitry 126, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to the unit under test (UUT) or process 150, or may be coupled to receive field signals, typically generated by transducers. The system 100 may be used in or for a digital signal processing application, in a data acquisition and control application, in a test and measurement application, an image processing or machine vision application, a process control application, a man-machine interface application, a simulation application, or a hardware-in-the-loop validation application, among others.

Figure 2B:
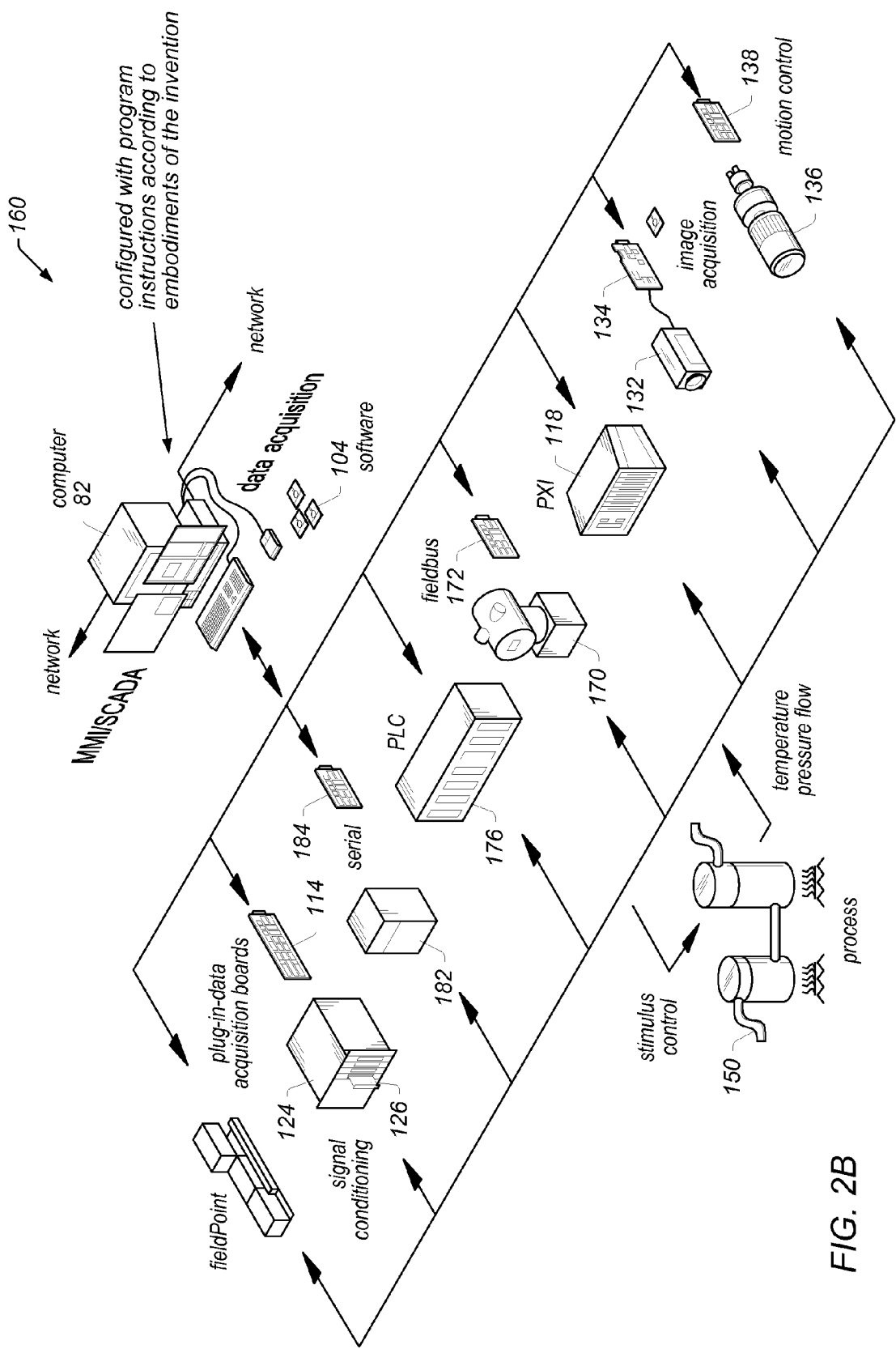
FIG. 2B illustrates an industrial automation system according to one embodiment of the invention.

FIG. 2B illustrates an exemplary industrial automation system 160 which may implement embodiments of the invention. The industrial automation system 160 is similar to the instrumentation or test and measurement system 100 shown in FIG. 2A. Elements which are similar or identical to elements in FIG. 2A have the same reference numerals for convenience. The system 160 may comprise a computer 82 which couples to one or more devices or instruments. The computer 82 may comprise a CPU, a display screen, memory, and one or more input devices such as a mouse or keyboard as shown. The computer 82 may operate with the one or more devices to perform an automation function with respect to a process or device 150, such as MMI (Man Machine Interface), SCADA (Supervisory Control and Data Acquisition), portable or distributed data acquisition, process control, advanced analysis, or other control, among others.

The one or more devices may include a data acquisition board 114 inserted into or otherwise coupled with chassis 124 with associated signal conditioning circuitry 126, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the fieldpoint system available from National Instruments, among other types of devices.

FIG. 3A is a high-level block diagram of an exemplary system which may execute or utilize graphical programs. FIG. 3A illustrates a general high-level block diagram of a generic control and/or simulation system which comprises a controller 92 and a plant 94. The controller 92 represents a control system/algorithm the user may be trying to develop. The plant 94 represents the system the user may be trying to control. For example, if the user is designing an ECU for a car, the controller 92 is the ECU and the plant 94 is the car's engine (and possibly other components such as transmission, brakes, and so on.) As shown, a user may create a program, such as a graphical program, that specifies or implements the functionality of one or both of the controller 92 and the plant 94. For example, a control engineer may use a modeling and simulation tool to create a model (e.g., graphical program) of the plant 94 and/or to create the algorithm (e.g., graphical program) for the controller 92.

FIG. 3B illustrates an exemplary system which may perform control and/or simulation functions. As shown, the controller 92 may be implemented by a computer system 82 or other device (e.g., including a processor and memory medium and/or including a programmable hardware element) that executes or implements a graphical program, or a program generated based on a graphical program. In a similar manner, the plant 94 may be implemented by a computer system or other device 144 (e.g., including a processor and memory medium and/or including a programmable hardware element) that executes or implements a graphical program, or may be implemented in or as a real physical system, e.g., a car engine.

In one embodiment of the invention, one or more graphical programs may be created which are used in performing rapid control prototyping. Rapid Control Prototyping (RCP) generally refers to the process by which a user develops a control algorithm and quickly executes that algorithm on a target controller connected to a real system. The user may develop the control algorithm using a graphical program, and the graphical program may execute on the controller 92, e.g., on a computer system or other device. The computer system 82 may be a platform that supports real-time execution, e.g., a device including a processor that executes a real-time operating system (RTOS), or a device including a programmable hardware element.

In one embodiment of the invention, one or more graphical programs may be created which are used in performing Hardware in the Loop (HIL) simulation. Hardware in the Loop (HIL) refers to the execution of the plant model 94 in real time to test operation of a real controller 92. For example, once the controller 92 has been designed, it may be expensive and complicated to actually test the controller 92 thoroughly in a real plant, e.g., a real car. Thus, the plant model (implemented by a graphical program) is executed in real time to make the real controller 92 "believe" or operate as if it is connected to a real plant, e.g., a real engine.

In the embodiments of FIGS. 2A, 2B, and 3B above, one or more of the various devices may couple to each other over a network, such as the Internet. In one embodiment, the user operates to select a target device from a plurality of possible target devices for programming or configuration using a graphical program or a program generated based on a graphical program. Thus the user may create a graphical program on a computer and use (execute) the graphical program on that computer or deploy the graphical program to a target device (for remote execution on the target device) that is remotely located from the computer and coupled to the computer through a network.

Graphical software programs which perform data acquisition, analysis and/or presentation, e.g., for digital signal processing, measurement, instrumentation control, industrial automation, modeling, or simulation, such as in the applications shown in FIGS. 2A and 2B, may be referred to as virtual instruments.

Figure 4:
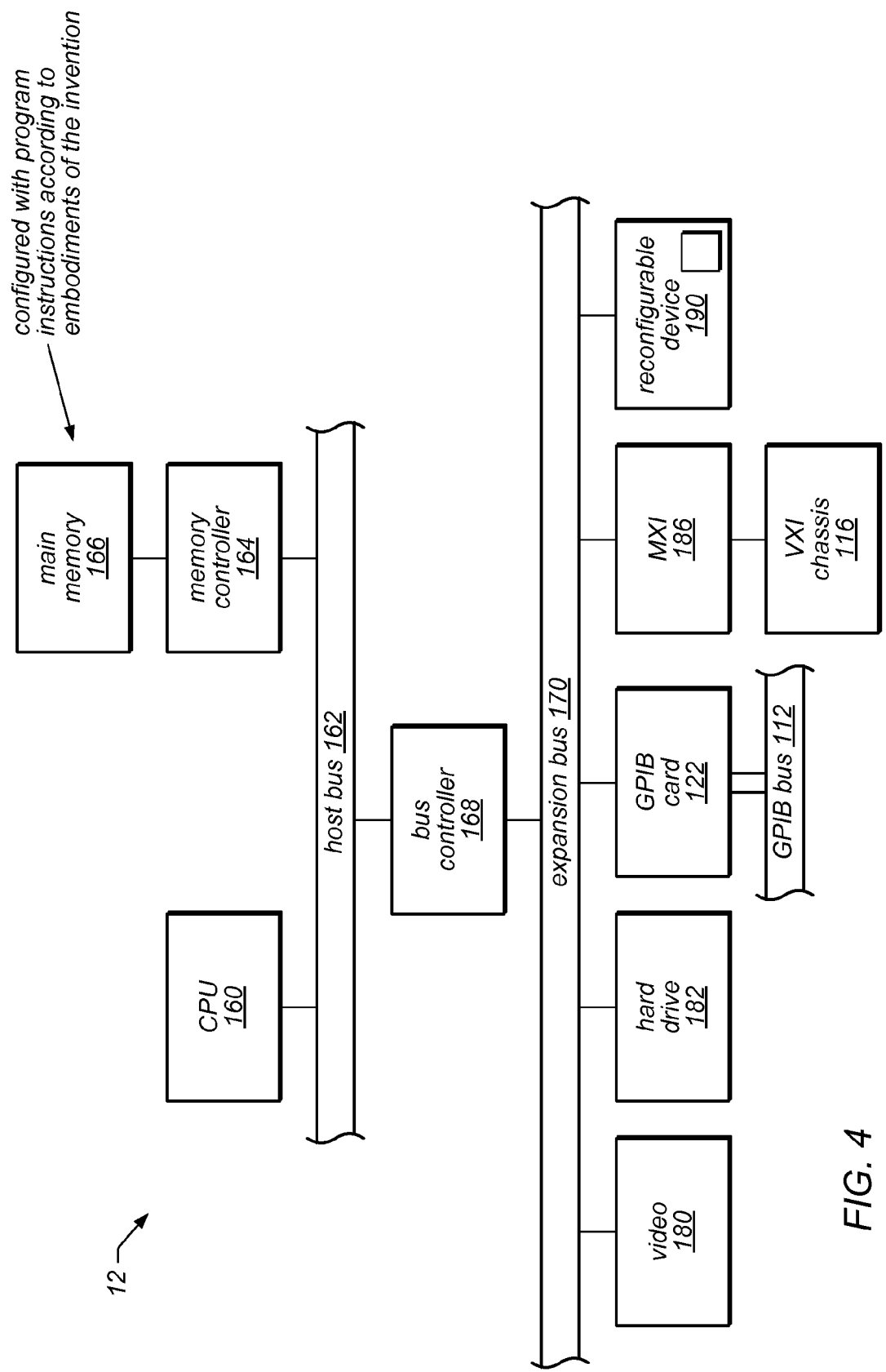
FIG. 4 is an exemplary block diagram of the computer systems of FIGS. 1A, 1B, 2A and 2B and 3B.

FIG. 4—Computer System Block Diagram

FIG. 4 is a block diagram representing one embodiment of the computer system 82 and/or 90 illustrated in FIGS. 1A and 1B, or computer system 82 shown in FIG. 2A or 2B. It is noted that any type of computer system configuration or architecture can be used as desired, and FIG. 4 illustrates a representative PC embodiment. It is also noted that the computer system may be a general-purpose computer system, a computer implemented on a card installed in a chassis, or other types of embodiments. Elements of a computer not necessary to understand the present description have been omitted for simplicity.

The computer may include at least one central processing unit or CPU (processor) 160, which is coupled to a processor or host bus 162. The CPU 160 may be any of various types, including an x86 processor, e.g., an Intel iCore™ class, a PowerPC processor, a CPU from the SPARC family of RISC processors, or any others, as desired. A memory medium, typically comprising RAM and referred to as main memory, 166 is coupled to the host bus 162 by means of memory controller 164. The main memory 166 may store program instructions implementing embodiments of the present invention. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170. The computer 82 may also comprise a GPIB card 122 coupled to a GPIB bus 112, and/or an MXI device 186 coupled to a VXI chassis 116.

As shown, a device 190 may also be connected to the computer. The device 190 may include a processor and memory, which may execute a RTOS. The device 190 may also or instead comprise a programmable hardware element. The computer system may be configured to deploy a graphical program or a program generated based on a graphical program to the device 190 for execution on the device 190. The deployed program may take the form of graphical program instructions or data structures that directly represent the graphical program, or that were generated based on the graphical program. Alternatively, the deployed graphical program may take the form of text code (e.g., C code) generated from the graphical program. As another example, the deployed graphical program may take the form of compiled code generated from either the graphical program or from text code that in turn was generated from the graphical program. In some embodiments, the graphical program and/or the program generated from the graphical program are data flow programs. In a further embodiment, the generated program may be a hardware configuration program, and may be deployed to a programmable hardware element. Moreover, in some embodiments, the generated program may be suitable for deployment in a distributed manner, e.g., across multiple, possibly heterogeneous, targets. Thus, for example, a first portion of the program may be directed to a CPU based platform, while another portion may be targeted for a programmable hardware element.

Graphical Specification and Constraint Language

A graphical specification and constraint language may allow, facilitate, or provide for, specification of a model of computation and explicit declaration of constraints for programs, in addition to specifying the program functionality. In various embodiments, the graphical specification and constraint language may be useable via a graphical or textual interface. In other words, the language may be presented to designers with textual and/or graphical syntax.

For example, in one exemplary embodiment, the specification and constraint language may include one or more of the following features:

- formal semantics defined over the graphical design constructs (functional blocks, terminals, wires, etc.) in a (graphical) designer tool
- the ability to constrain multiple aspects, including structure, behavior and timing
- the availability of both graphical and textual syntax.

Constraint usage in a design flow may include one or more of:

- the combination of functional specification (with graphical design constructs in the designer tool) and design intent (with constraints)
- automatic design parameter tuning to meet design intent
- automatic constraint manipulation during design transformation (e.g., various optimizations to increase performance or resource utilization).

The specification and constraint language may facilitate analysis and optimization of graphical programs developed in the language. For example, one or more software tools, e.g., a designer tool, may exploit the relationship between the formal dataflow semantics and underlying timing models of target platforms (or hardware actors) for analysis and code generation. By utilizing such (hardware) models in combination with specified constraints via the specification and constraint language, some tasks or operations, such as the "stitching together" of functional blocks, e.g., IP blocks, e.g., for implementation in hardware, may be performed more easily, efficiently, effectively, and/or more reliably, as will be described in more detail below. Note that the terms "designer tool" and "development environment" may be used interchangeably.

Figure 5:
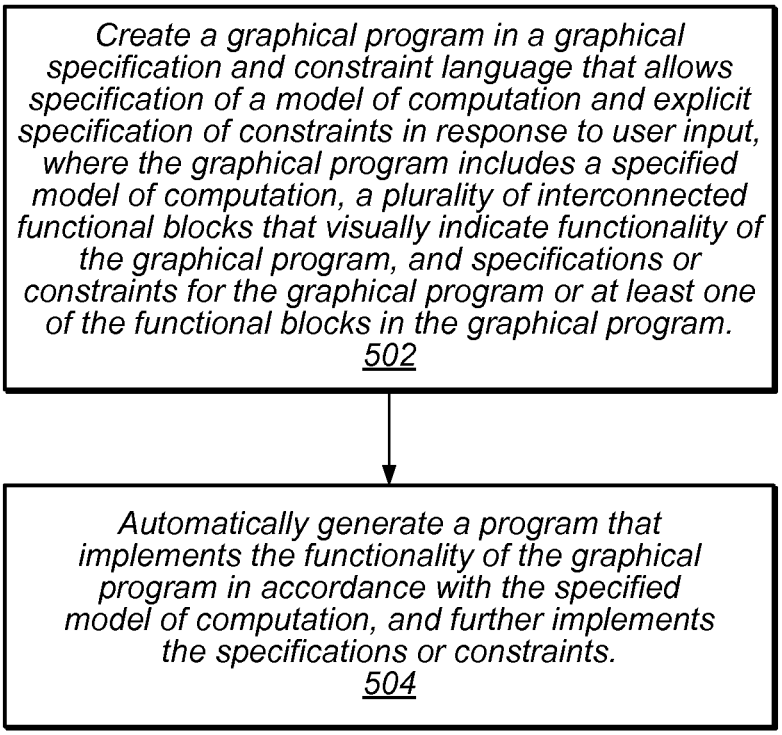
FIG. 5 is a flowchart diagram illustrating one embodiment of a method for creating a program.

FIG. 5—Flowchart of a Method for Creating a Program

FIG. 5 illustrates a method for creating a program. The method shown in FIG. 5 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

First, in 502 a graphical program (which may be referred to as a diagram) may be created on the computer system 82 (or on a different computer system), e.g., in response to user input. For example, the graphical program may be created or assembled by the user arranging on a display a plurality of nodes or icons (also referred to herein as functional blocks) and then interconnecting the nodes to create the graphical program. In response to the user assembling the graphical program, data structures may be created and stored which represent the graphical program. The nodes may be interconnected in a data flow format, although in other embodiments, at least some of the nodes may be interconnected in a control flow or execution flow format, as desired. The graphical program may thus comprise a plurality of interconnected nodes or icons (functional blocks) which visually indicate the functionality of the program. As noted above, the graphical program may comprise a block diagram and may also include a user interface portion or front panel portion. Where the graphical program includes a user interface portion, the user may optionally assemble the user interface on the display. As one example, the user may use a designer tool to create the graphical program. As another example, the user may use the LabVIEW™ graphical programming development environment (possibly with suitable extensions) to create the graphical program. In an alternate embodiment, the graphical program may be created in 502 by the user creating or specifying a prototype, followed by automatic or programmatic creation of the graphical program from the prototype. This functionality is described in U.S. patent application Ser. No. 09/587,682 titled "System and Method for Automatically Generating a Graphical Program to Perform an Image Processing Algorithm", which is hereby incorporated by reference in its entirety as though fully and completely set forth herein. The graphical program may be created in other manners, either by the user or programmatically, as desired. The graphical program may implement a measurement function that is desired to be performed by the instrument. For example, in an exemplary embodiment, the graphical program implements digital signal processing functionality. The graphical program may be or include a graphical data flow program.

As noted above, in some embodiments, a graphical program development environment may be provided which includes a graphical specification and constraint language that allows specification of a model of computation and explicit declaration of constraints. Thus, in some exemplary embodiments, the graphical program may be written in the graphical data flow specification and constraint language. The graphical data flow program may thus include a specified model of computation, a plurality of interconnected functional blocks that visually indicate functionality of the graphical data flow program in accordance with the specified model of computation, and specifications or constraints for the graphical data flow program or at least one of the functional blocks in the graphical data flow program.

In some embodiments, the specification and constraint language may be considered to be a combination of a specification language and a constraint language, although the two may overlap somewhat, and some distinctions between specifications and constraints may be subtle, e.g., based on context, as discussed below.

In one exemplary embodiment, the graphical program may be developed via a software tool, e.g., a designer tool, which provides a graphical design environment for data flow oriented system design. The basic building constructs in the designer tool may include functional blocks (which may also be referred to simply as "blocks"), terminals, and wires. Blocks may be designed with dataflow semantics, and may communicate with each other via terminals (on the blocks) through wires connecting the blocks. The design process from a user's viewpoint may thus include selecting (and/or creating) the appropriate blocks, arranging them, and connecting the terminals of the blocks using wires. To make the design process more efficient, a rich library of primitive blocks may be provided. Moreover, the designer tool may also provide or accommodate third party function blocks, e.g., IP blocks, and/or user-defined function blocks, which may be organized into a user library.

As noted above, the designer tool may include or utilize a graphical data flow specification and constraint language that allows explicit declaration of constraints, in addition to component-based (e.g., functional blocks and their interconnections) design. Note that constraints may convey certain information more effectively than the component-based design aspects of the language. For example, the component-based design portion of the language, which may be referred to as the component or specification language, may be used to implement or present a "skeleton" of the program or system, which includes individual functional blocks and the structural connectivity among those blocks, whereas constraint-related aspects of the language, which may be referred to as the constraint language, may represent properties associated with the building blocks, with the structural connectivity, with the program or system performance, and so forth. Moreover, rather than simply describing various properties of the blocks or their connectivity, constraints may be used as a means to convey design space exploration intent. Thus, constraints may specify or indicate the direction in which designers would like to tune the system, e.g., to improve or optimize system performance or resource utilization.

Note that a specification is usually within some domain of discourse, while a constraint is generally outside the domain. For example, if the domain of discourse is an untimed model of computation (static dataflow for example), then any timing declaration may be considered a constraint. But if the domain of discourse is timed dataflow, then timing may be part of the specification. There can be different domains of discourse supported by a single designer tool.

In some embodiments, the constraint language may be defined over a set of subjects, such as, for example, entities (including functional blocks, terminals and wires), properties (structural, behavioral or timing) associated with the entities, and constants. In some exemplary embodiments, the specifications or constraints may be with respect to one or more of: throughput of terminals on the functional blocks, throughput of the graphical program, clock rate of the graphical program, buffer sizes between functional blocks, or latency (or delays) between functional block inputs and corresponding functional block outputs, among others.

Relations among entities may be described by Boolean operators, arithmetic operators, or temporal operators. Subjects and relations may thus form the foundation of the specification and constraint language. Note that the language may define precise and formal semantics, but in some embodiments may be presented to designers with both textual syntax and graphical syntax, as mentioned above. Thus, the graphical specification and constraint language may integrate well with or into the graphical design environment of the designer tool.

In some embodiments, the specifications or constraints included in the graphical program may include one or more of:

input count (IC), comprising a number of tokens consumed at an input terminal of the at least one functional block by one firing of the at least one functional block;

output count (OC), comprising a number of tokens produced at an output terminal of the at least one functional block by one firing of the at least one functional block;

execution time (ET), comprising a number of cycles needed by the at least one functional block to complete firing;

initiation interval (II), comprising a minimum number of cycles between firings of the at least one functional block;

input pattern (IP), comprising a sequence of Boolean values, wherein the sequence of Boolean values aligns with the beginning of firing of the at least one functional block, wherein each true value in the sequence denotes consumption of a token at an input terminal of the at least one functional block; or output pattern (OP), comprising a sequence of Boolean values, wherein the sequence of Boolean values aligns with the end of firing of the at least one functional block, wherein each true value in the sequence denotes production of a token at an output terminal of the at least one functional block.

Input and output patterns may be referred to collectively as access patterns.

Note, however, that the above items are meant to be exemplary only, and that other items or terms may be used as desired. For example, in some embodiments, the specifications or constraints may also include information regarding parameters or states of the functional blocks or target platforms. As one example, the ET may specify an amount of time and a flag denoting whether the execution time is exact or worst case. As another example, in some embodiments, the Boolean sequence of the input pattern (IP) or output pattern (OP) may have a length of at most the value of II. As a further example, in some embodiments, the IP and/or OP sequences may not be Boolean, e.g., may be integers, so long as the sum of the sequence elements is equal to IC or OC, respectively.

Note that for the IP sequence, the beginning of the sequence aligns with the beginning of firing, whereas for the OP sequence, the end of the sequence aligns with the end of firing.

In some embodiments, the specifications or constraints may have a standardized format, such that the functional blocks (e.g., IP blocks) can be described by third parties. For example, tools or specifications such as IP-XACT (which is an extensible markup language format that defines and describes electronic components and their designs) may be extended to include or define an interface for accessing the information regarding implementation and the high-level model of computation for the functional blocks.

In one embodiment, in addition to the foundational or basic constraint language, a set of constraints commonly used by designers may be provided, e.g., throughput constraint, latency constraint, etc., which may not only provide convenience to designers, but may also allow the designer tool to associate or invoke more effective assisting tools to analyze the graphical program with respect to particular constraints. For example, when the designer adds a throughput constraint to the system, a static analysis tool may be invoked to determine the actual throughput, and therefore to determine whether the constraint is met. In contrast, if the designer expresses the same throughput constraint via the basic constraint language, a more elaborate flow may be engaged, e.g., running a simulation tool and checking the timed trace against the constraint.

To meet these unique performance and resource needs, the designer tool may provide a framework for analyzing programs/applications and/or application models, explore trade-offs between performance and resource usage, or select implementation strategies. Through specifications and/or constraints on the graphical program (which may be referred to as a diagram), the designer tool may capture the user's intent for the application and may use the framework to provide early feedback on the design while also generating efficient and high performance implementations.

In 504, a program may be generated that implements the functionality of the graphical program in accordance with the specified model of computation, and further implements the specifications or constraints. In some embodiments, the program may be targeted for implementation in hardware, e.g., the program may be useable to configure a programmable hardware element, such as an FPGA, to perform the functionality subject to the specifications or constraints. For example, the method may include generating a hardware configuration program based on the program, where the hardware configuration program is useable to configure a programmable hardware element, such as an FPGA.

Alternatively, the program may be targeted to a processor based platform, and thus may be compiled and/or interpreted for execution by one or more processors. More generally, in various embodiments, the generated program may be targeted for execution on any of a variety of platforms, including, for example, collections of FPGAs (or other programmable hardware elements), multi-core processors, multi-processor systems, embedded processors, or any combinations thereof. Thus, the platform may be homogenous or heterogeneous, as desired.

In various embodiments, the generated program may be a textual data flow program, e.g., in the C programming language, or a graphical data flow program. For example, the generated data flow program may be a LabVIEW graphical program (VI).

In some embodiments, the generated program or description may not be data flow, but rather may be in an imperative program form. Furthermore, a more specific hardware-centric description, e.g. one at the register transfer level (RTL, e.g., VHDL or Verilog, SystemC), may be used for implementation directly. Similarly, when targeting (instruction level) processors or many cores or graphical processing units (GPUs), descriptions or programs more suitable for those targets may be generated directly, e.g., annotated or modified imperative code, such as C/CUDA (Compute Unified Device Architecture), or OpenCL. Thus, in various embodiments, the generated program may be of any type desired.

In some embodiments, the method may further include analyzing the graphical program, including analyzing the specifications or constraints, thereby producing analysis results. The automatic generation of the program may then be performed based on the analysis results.

In one embodiment, at least some of the model of computation, and specifications or constraints, may be projected onto a lower dimensional space to simplify and speed at least a portion of the analyzing. Examples of such lower-dimensional projections include a simplified model of computation, or a less specified or constrained access pattern. Thus, for example, the analysis tool may chose to ignore access patterns specifications from specific functional blocks, and provide a resulting implementation that consumes all tokens before running a given functional block, and similarly produces all the tokens before signaling a connected functional block that it has completed its operation. Moreover, in some embodiments, simple analysis may be performed in real-time, and complex and more time-consuming analysis may be performed as a background process as time permits in an asynchronous manner, e.g., while the method (e.g., designer tool) performs other functions.

In one embodiment, the steps of the analysis may be stored, codified, or remembered, as a model transformation during (design) exploration, and may be reproduced for either code generation, or secondary (design) exploration.

In some embodiments, the designer tool may utilize or include various models to aid in analyzing the graphical program. For example, in one embodiment, the designer tool may include one or more platform models that may include information regarding target platforms, and/or one or more application models that include information regarding applications or graphical programs. In one embodiment, a platform model is or includes a set (i.e., unchanging) model of a platform element. For example, it may be a model (including for example, clock speed, FPGA resources, etc.) of a piece of hardware or a set of known parameters of a software block, such as, for example, how long it will take to execute, how many resources it will consume, and so forth. An application model is a model of the actual application itself, and includes which blocks are connected together, how will they execute, and so forth.

In one embodiment, the specification or constraints may include one or more user-provided specifications. The method may automatically convert the one or more user-provided specifications into a corresponding one or more constraints before the analyzing and automatically generating the program. For example, a specification for throughput at the model of computation level may result in two constraints at lower levels: a constraint that specifies the clock frequency at which the program on the hardware element should execute, and a constraint on the number of cycles the program should take overall, resulting in a total amount of time that the program takes to execute. Similar constraints can be directly or indirectly applied for buffer sizes and latency.

Further details regarding the analysis of the graphical program are provided below.

Figure 6:
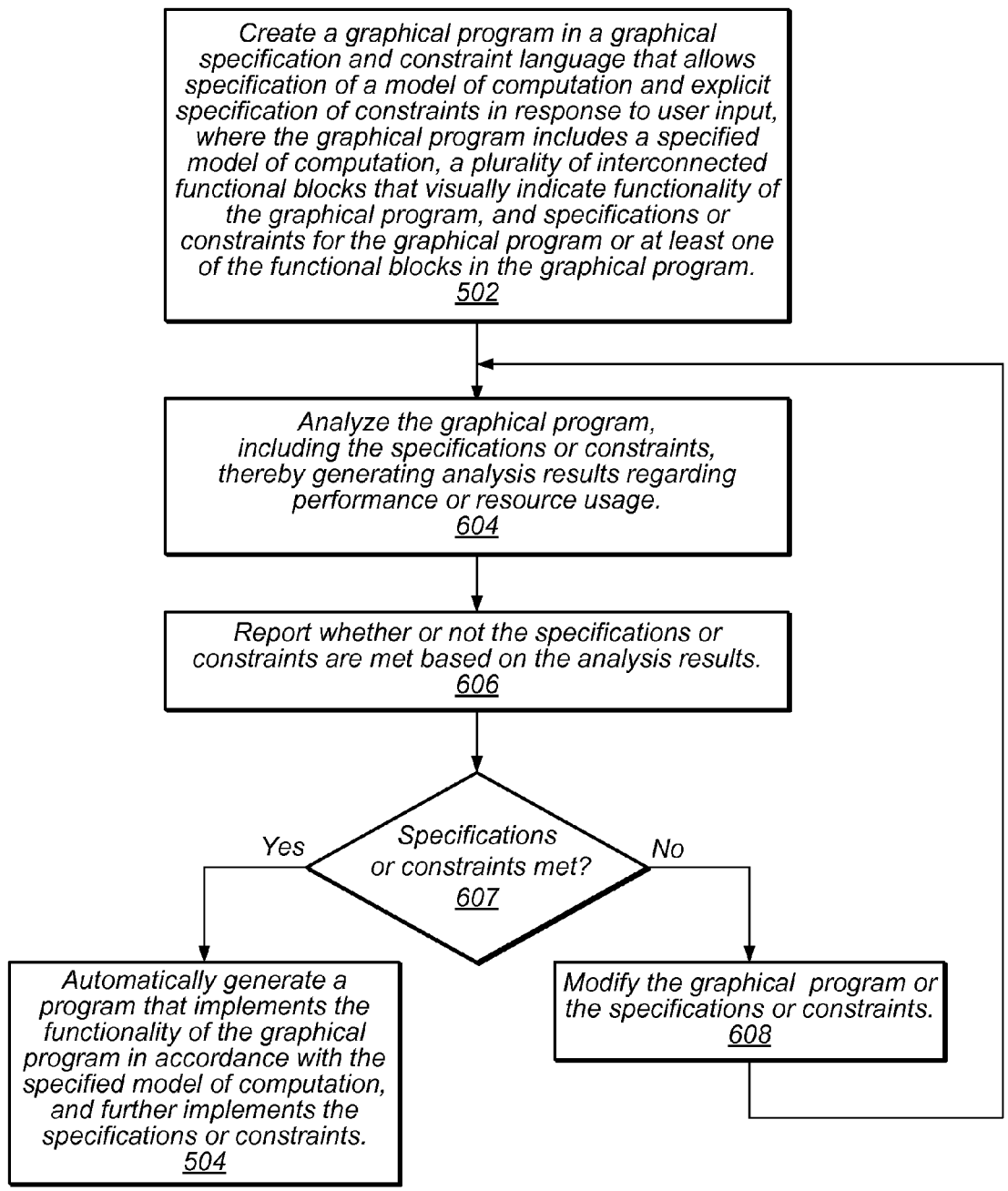
FIG. 6 is a flowchart illustrating a method for developing a program, according to one embodiment.

FIG. 6—Flowchart of a Method for Developing a Program

FIG. 6 illustrates a method for developing a program. The method shown in FIG. 6 may be used in conjunction with any of the computer systems or devices shown in the above Figures, among other devices. In various embodiments, some of the method elements shown may be performed concurrently, in a different order than shown, or may be omitted. Additional method elements may also be performed as desired. Note that where method elements are the same or similar to method elements described previously, descriptions may be abbreviated. As shown, this method may operate as follows.

First, in 502 a graphical program (which may be referred to as a diagram) may be created on the computer system 82 (or on a different computer system), e.g., in response to user input, as described above with reference to FIG. 5. As discussed above, in some embodiments, the user may use a designer tool to create the graphical program, while in other embodiments, the user may use a provided graphical program development environment which includes a graphical specification and constraint language that allows specification of a model of computation and explicit declaration of constraints, e.g., the LabVIEW graphical programming development environment (possibly with suitable extensions), to create the graphical program. As also mentioned above, in some embodiments, the graphical program is a graphical data flow program. As described above with reference to FIG. 5, the graphical program may include a specified model of computation, a plurality of interconnected functional blocks that visually indicate functionality of the graphical program in accordance with the specified model of computation, as well as graphically indicated specifications or constraints for at least one of the functional blocks in the graphical program.

Figure 7:
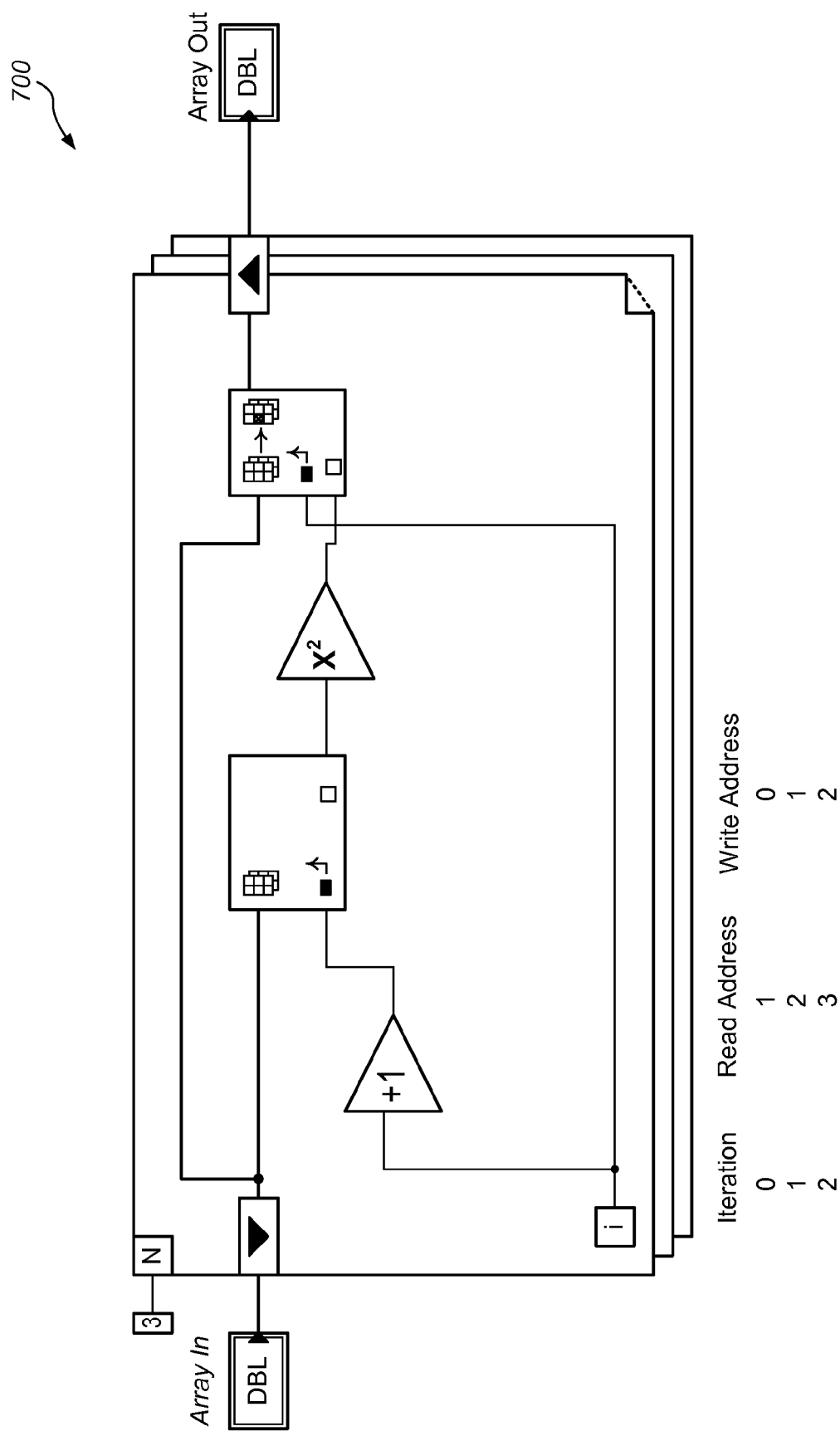
FIG. 7 shows an example of a graphical representation of a simple input program that may be represented in hardware.

FIG. 7—Graphical Representation of a Simple Input Program

FIG. 7 shows an example of a graphical representation of a simple input program that may be synthesized for implementation, for e.g. in an FPGA. The input program may be representative of a particular function or combination of functions or application(s) intended to be physically implemented, e.g. by some of the methods previously described. As part of the synthesis process, constraints may be included as parameters in files used as input during the synthesis process. One example of a timing path that may be returned from a post place and route timing analysis for the example program of FIG. 7 is shown below (note that the Physical/Logical Resource designations of the right column falls on the next line):

compilation process to obtain the desired end application, which in this example is RTL compiled for a third party platform, e.g. an FPGA such as Xilinx.

The decisions may include resource selection (806), register placement (808), and scheduling (810), and/or any other considerations that may be applicable to the process and the target (or end) application. Because the end application is a form of hardware in this example, the implementation, or process flow then moves into the register transfer language (RTL) or hardware description language (HDL, e.g. VHDL) code generation phase (812), followed by RTL compilation (814), which may be to any one of many available hardware choices. For example, the RTL may be compiled for an FPGA, such as a Xilinx FPGA for example, or it may be synthesized to a fabrication process using a standard cell library, or some other desired end hardware result. In the examples and embodiments discussed herein,

| Location | Delay type | Delay (ns) | Physical Resource Logical Resource(s) |
|---|---|---|---|
| DSP48_X1Y23.P37 | Tdspcko_P_PREG | 0.494 | |
| DSP48Node70/dsp48CoregenInst/BU2/U0/i_synth_option.i | | _synth_model/opt | _vx6.i_uniwrap/i _primitive |
| DSP48Node70/dsp48CoregenInst/BU2/U0/i _synth_option.i_synt h_model /opt_vx6.i_uniwrap/i_primitive | | | |
| DSP48_X2Y21.C40 <37> | net (fanout = 13) | 1.562 | cDSP48Node70_0out |
| DSP48_X2Y21.CLK | Tds pdck_C_PREG | 1.571 | |
| DSP48Node48/ds p48CoregenInst/BU2/U0/i_synth_option.i_synth_model/opt _vx6.i_uniwrap/i_primitive | | | |
| DSP48Node48/ds p48CoregenInst/BU2/U0/i _synth_option.i_synth_model/opt _vx6.i_uniwrap/i _primitive | | | |
| Total | | 3.627ns (2.065ns logic, 1.562ns route) | |

If the goal is to have all path delays shorter than 2.5 ns, and the total delay is 3.627 ns, the user may have to find a way to reduce this cryptic path. However, it may not be possible to establish a correspondence between this path and the original program, or any intermediate steps, where different decisions can be made without knowledge of what transformations are performed along the way. It is one major reason why automatic feedback to change compilation/optimization decisions is important. In one set of embodiments, real information from the compilation may be provided back to earlier stages in the compilation (compile) process, so different decisions may be made to obtain a more optimal result. Without such feedback mechanism, the user may have to either provide means for provide manual feedback, or simply assume that the tool performed as well as is possible, when in fact that may not have been the case.

Figure 8:
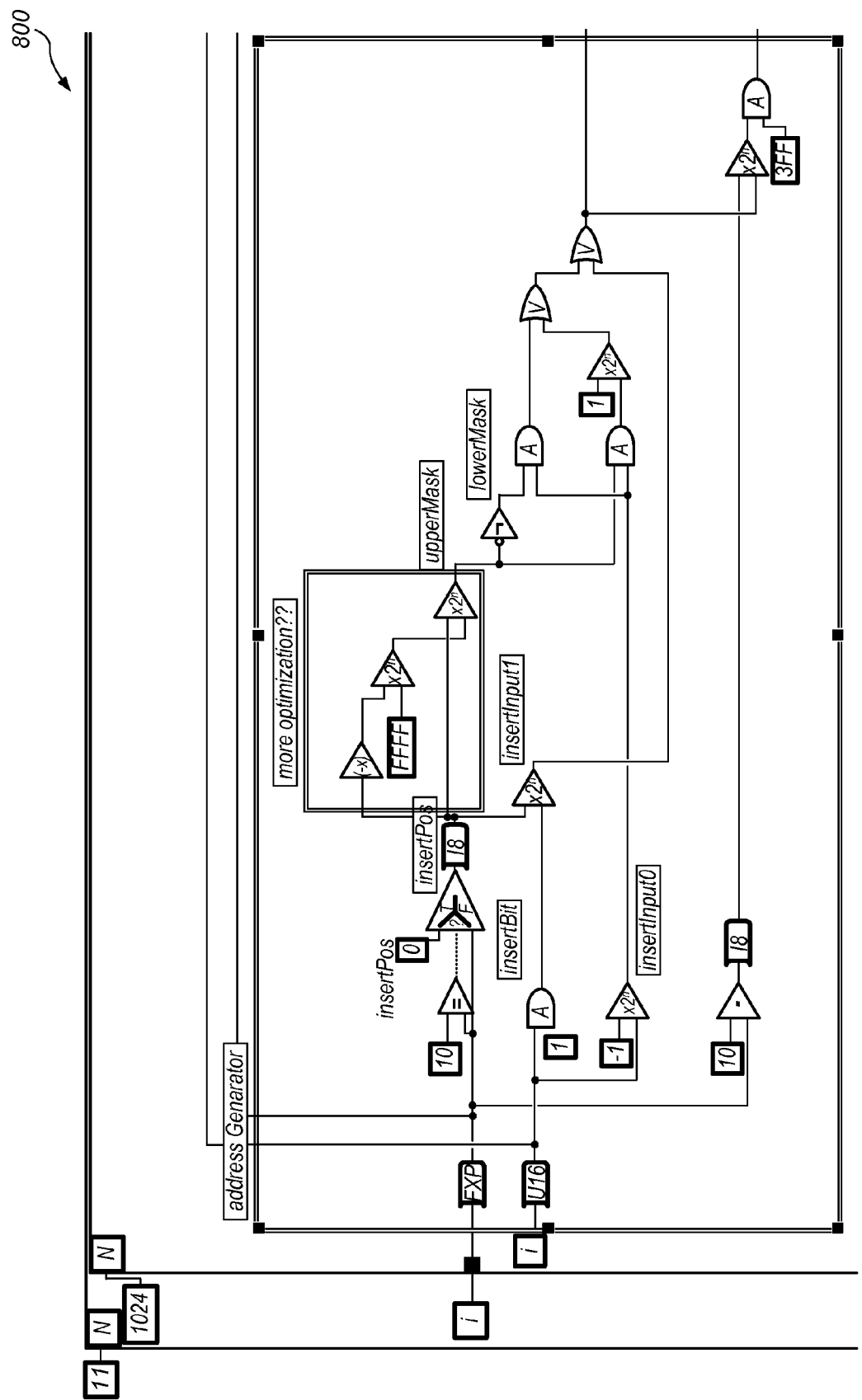
FIG. 8 is a flowchart illustrating a method for generating a hardware representation of a graphical program input, according to one embodiment.

FIG. 8—Graphical Representation of Important Decision Steps During Compilation

FIG. 8 shows a flow chart 800 highlighting important decision steps made in the compilation process and the auto feedback that may be provided to these decision steps. Flowchart 800 provides the steps as they may be applied to a specific design culminating in and end "application" that is a compiled RTL code representative of a function or set of functions. However, it should be noted that the process illustrated in flowchart 800 may be equally used during the compile/compilation process where the end application is different, for example a desktop application or RTL compiled for a mix-use hardware platform such as a CPU. The process may start with a high-level program, which may be a graphical input program, such as shown in FIG. 7 being finalized for the compilation process (804). Once the program has been determined, a series of decisions may be made regarding implementation of the program through the compilation is to an FPGA. If all the design constraints have been met ("Yes" branch from 816), the compilation/design process is complete. Otherwise, automatic feedback (802) may be provided to any one or more of the previous design stages, to allow flexible and efficient control of the design process. In general, the goal is to include options for improving resource usage during the design process or design flow. However, one of the main challenges is to account for, and minimize timing failures. There are typically two options for dealing with timing failures.

A first option for dealing with timing failures may include retiming registers that already exist in the design. This is an option when there are relaxed timing requirements somewhere along the timing path (i.e. there is available time to work with along the timing path) but the relaxed timing or available time is not in the right/correct location along the timing path. In such a case register placements may be modified slightly to improve timing paths. While some prior art solutions are available for this option, they typically don't allow corrections to be made as far up the code generation stack as might be desirable. A second option for dealing with timing failures is the use of additional registers. Since development starts at a higher-level representation than RTL (e.g. see graphical program representation 700 in FIG. 7), there is freedom to add more registers to the design along paths that fail timing. In one set of embodiments, an algorithm to add more registers may include analyzing the timing report returned from synthesis (e.g. as shown above with respect to program 700), and taking into account previous timing adjustments that have been made.

Figure 9:
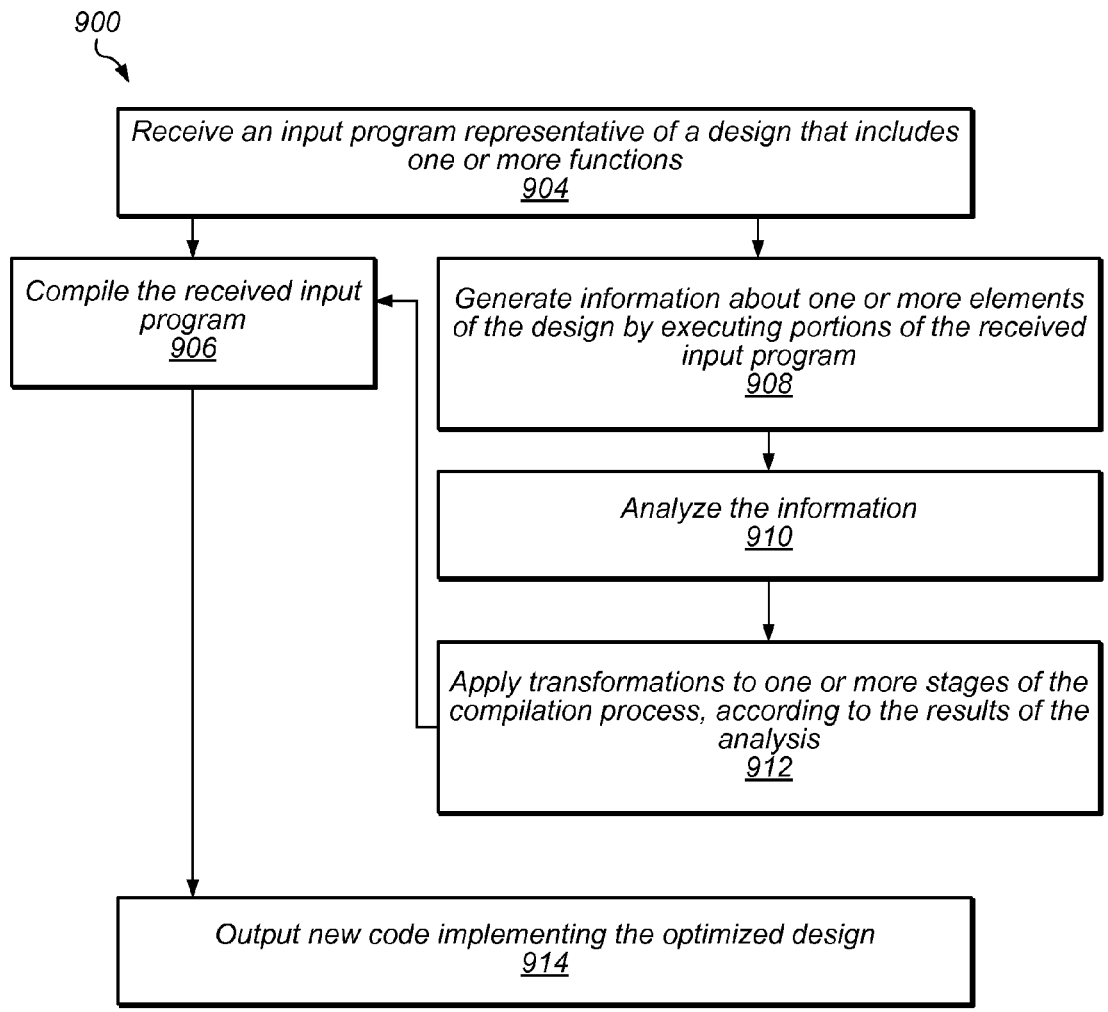
FIG. 9 is a flowchart illustrating a method for correcting timing paths in a design, according to one embodiment.

FIG. 9—Graphical Representation of Automatic Timing and Resource Adjustments

The flow chart of one embodiment of an algorithm to improve timing in a design according to the automated compilation analysis flow presented in FIG. 8 is shown in FIG. 9. The algorithm 900 may operate to determine/ascertain if previous timing adjustments, i.e. timing adjustments that have previously been made during the design flow were useful and/or effective. First, an RTL/VHDL code may be generated based on the highest-level representation (e.g. graphical representation) of the program/design (902). The generated code may then be compiled, e.g. for an FPGA such as a Xilinx FPGA, which returns (among other things) a timing report (904). The timing report may be parsed for failed period constraint paths (906), and the delays may be compared to delays present/obtained during a previous compile (908). If the timing adjustments that have previously been made during the design flow were not useful or effective, the algorithm may proceed to undo those previous timing changes (910). The algorithm may also proceed to store information identifying those timing changes to ensure that the same timing changes are not repeated in the future. The algorithm may then search for other options to implement timing changes. In one embodiment, the longest component delays are identified, and an attempt is made to add registers to those components (912). Once the longest component delays have been identified, and an attempt has been made to add registers to those components, new path lengths may be predicted (914), and a determination may be made whether all paths are predicted to pass (916). If there are still failing paths ('No' branch from 916), the next longest component delay may be determined, and a register added (912), until all paths are predicted to pass (Yes' branch from 916). Once all paths are predicted to pass, the process may be started for another design (902).

It should also be noted that adding registers (seemingly) randomly, that is in a non-deterministic manner may help identify more quickly those components that might make a difference in the timing path, rather than moving methodically from components corresponding to a longest timing path to components corresponding to a shortest timing path. In other words, oftentimes the best benefit during a subsequent compile may not be obtained by correcting the longest component (delay encountered) in a failed timing path. Another approach may be to adjust high fan-out nets first. Conceptually, similar algorithms may be developed for responding to over-mapping resources. In that case, instead of adjusting registers, it may be preferable to share hardware, or simply use different hardware resources to perform the same algorithmic job (e.g., using block RAM instead of Flip-Flops (FFs) is a common hardware resource tradeoff).

In one set of embodiments, upon completion of a respective stage of an FPGA compile process of a high-level program, timing path information and resource usage information may be automatically fed back (provided) to the completed respective stage in order to ascertain which commands may be attempted differently to affect transformations that lead to more optimal results, e.g. more optimal timing results during the next compile. It should be noted that information to be returned to the various compile stages may be collected in other domains as well, for example, information about connectivity congestion may also be collected, and any other information characteristic of the compile process and relating to the target application for which the compile process is being performed. A compile, for example an FPGA compile may include any third party, chip specific compile flow, such as a Xilinx compile, Altera compile, or National Instruments proprietary chip compile flow among others. The different stages of the compile may include pre-synthesis timing and/or resource estimates (sometimes referred to as 'fast synthesis'), post-synthesis timing and/or resource estimates, post-map timing and/or resource estimates, and post-place and route timing and/or resource usage actual results.

A high-level program/language may be any program described in graphical form (e.g. program 700 in FIG. 7), a LabVIEW program, or an M-Script, text based program, C or C++, among others. The timing path information may include any report describing either actual timing paths or estimates of the timing paths in the design, any report describing actual or estimated period constraint failures, and both logic delays and routing delays. In embodiments where the design is compiled for a Xilinx FPGA, the timing path information may include Xilinx ".twx" and/or ".twr" file reports. Furthermore, the resource usage information may include any report describing either actual resource usage or estimated resource usage of the entire compiled bitstream at various respective stages, and/or any report describing resource usage of sub components in the compiled bitstream at various respective stages. In embodiments where the design is compiled for a Xilinx FPGA, the resource usage information may also include Xilinx .par and/or ".xrpt" files, and a Xilinx ".ncd" file and/or any report derived from the Xilinx ".ncd" file.

The commands used during the compile process may include any command that may be used to affect timing, any command that may be used to affect resource usage, and any command that may be randomly changed to learn what may affect timing or resource usage. The commands may further include directives, constraints, parameters, timing estimate values, resource estimate values, attributes, annotations, and comments in HDL. Finally, the transformations may include adding registers along paths that fail timing constraints, removing registers along paths that pass timing constraints, adding registers in a tree structure on high fan-out signals, retiming register placements from a higher level than RTL, rescheduling to take into account register adjustments, resource sharing program pieces to cut down on resource usage, different resource selection to change timing and/or resource usage (e.g. a common resource selection change involves using block memory instead of flip flops inside the FPGA), running more optimization routines, changing the structure of the generated RTL (e.g. using a Coregen generated multiply instead of an inferred multiply), and undoing transformations from previous compiles if it is determined that the changes didn't yield the desired results.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A computer-implemented method, comprising:
receiving a program representative of a hardware design of one or more functions;
producing a hardware representation of the hardware design by running the received program through a compilation process that comprises multiple stages, wherein the hardware representation of the hardware design is subject to one or more constraints, wherein said producing the hardware representation of the hardware design comprises:
collecting information relating to characteristics of the hardware design throughout the compilation process, wherein the characteristics of the hardware design include timing path information of the hardware design, and wherein the hardware representation of the hardware design does not meet at least one of the one or more constraints; and performing, until the one or more constraints are met:
automatically adjusting one or more stages of the compilation process prior to completion of the compilation process, based on the collected information via a programming interface, including automatically adjusting timing path implementation decisions, thereby adjusting the compilation process, including:
producing a timing report resulting from the compilation process, wherein the timing report comprises one or more failed timing constraint paths; and
adding one or more registers along at least one of the one or more failed timing constraint paths in response to receiving input instructions via the programming interface, in order to improve the timing paths; and
performing said producing via the adjusted compilation process;
wherein said automatically adjusting one or more stages of the compilation process comprises:
comparing the timing report with a prior timing report obtained from a previous compilation process performed on the received program, said comparing comprising:
parsing the one or more failed timing constraint paths in the timing report; and
comparing timing delays comprised in the failed timing constraint paths to timing delays comprised in corresponding timing constraint paths in the prior timing report; and
adjusting timing paths in the hardware design according to results of the comparison of the timing report with the prior timing report, wherein said adjusting comprises:
finding a longest preexisting component delay from the failed timing constraint paths; and
adding a register in a timing path corresponding to the found delay.

2. The computer-implemented method of claim 1, wherein the multiple stages comprise two or more of:
resource selection decisions;
register placement decisions;
scheduling decisions;
hardware description language (HDL) code generation; or
HDL compilation.

3. The computer-implemented method of claim 1, wherein the program is a graphical program.

4. The computer-implemented method of claim 1, further comprising:
providing a respective corresponding portion of the collected information to each stage of the multiple stages of the compilation process.

5. The computer-implemented method of claim 4, wherein the programming interface is configured to make adjustments to any stage of the multiple stages responsive to the respective corresponding portion of the collected information to the stage.

6. The computer-implemented method of claim 1, wherein said adjusting timing path implementation decisions comprises:
modifying register placements for the purpose of adjusting timing paths in response to receiving input instructions via the programming interface, in order to improve the timing paths.

7. The computer-implemented method of claim 1, wherein said adjusting the timing paths comprise:
undoing previous timing adjustments that didn't produce desired results, responsive to said comparing the timing delays.

8. The computer-implemented method of claim 1, further comprising:
predicting new path lengths subsequent said adjusting the timing paths.

9. The computer-implemented method of claim 8, further comprising:
adjusting the timing paths in the hardware design until the predicted new path lengths meet desired constraints.

10. The computer-implemented method of claim 1, wherein the information relating to the characteristics of the hardware design comprises information relating to timing and resource utilization.

11. A non-transitory computer-accessible memory medium that stores program instructions executable by a computer system to:
receive a program representative of a hardware design comprising one or more functions;
implement the hardware design through a compilation process performed on the received program, wherein the compilation process comprises multiple stages, wherein the implementation of the hardware design is subject to one or more constraints;
collect information relating to characteristics of the hardware design throughout the compilation process, wherein the characteristics of the hardware design include timing path information of the hardware design, and wherein the implementation of the hardware design does not meet at least one of the one or more constraints; and
perform, until the one or more constraints are met:
automatically adjust one or more stages of the compilation process prior to completion of the compilation process, based on the collected information via a programming interface, including automatically adjusting timing path implementation decisions, wherein to automatically adjust one or more stages of the compilation process prior to the completion of the compilation process, the program instructions are executable to:
produce a timing report resulting from the compilation process, wherein the timing report comprises one or more failed timing constraint paths; and
add one or more registers along at least one of the one or more failed timing constraint paths in order to improve the at least one timing path; and
perform said implementing and said collecting via the adjusted compilation process;
wherein to automatically adjust one or more stages of the compilation process, the program instructions are executable to:
compare the timing report with a prior timing report obtained from a previous compilation process performed on the received program, wherein to compare the timing report with the prior timing report the program instructions are executable to:
parse the one or more failed timing constraint paths in the timing report; and
compare timing delays comprised in the failed timing constraint paths to timing delays comprised in corresponding timing constraint paths in the prior timing report; and adjust timing paths in the hardware design according to results of the comparison of the timing report with the prior timing report, wherein to adjust the timing paths the program instructions are executable to:
  find a longest preexisting component delay from the failed timing constraint paths; and
  add a register in a timing path corresponding to the found delay.

12. The non-transitory computer-accessible memory medium of claim 11, wherein the multiple stages comprise two or more of:
  resource selection decisions;
  register placement decisions;
  scheduling decisions;
  hardware description language (HDL) code generation; or
  HDL compilation.

13. The non-transitory computer-accessible memory medium of claim 11, wherein the program is a graphical program.

14. The non-transitory computer-accessible memory medium of claim 11, wherein the program instructions are further executable to:
  provide a respective corresponding portion of the collected information to each stage of the multiple stages.

15. The non-transitory computer-accessible memory medium of claim 14, wherein the programming interface is configured to make adjustments to any stage of the multiple stages responsive to the respective corresponding portion of the collected information provided to the stage.

16. The non-transitory computer-accessible memory medium of claim 11, wherein the adjustments to the one or more stages comprise modification of register placements for the purpose of adjusting timing paths, in order to improve the timing paths.

17. The non-transitory computer-accessible memory medium of claim 11, wherein the program instructions are further executable to:
  undo previous timing adjustments that didn't produce desired results, responsive to comparing the timing delays.

18. The non-transitory computer-accessible memory medium of claim 11, wherein the program instructions are further executable to:
  predict new path lengths subsequent to the adjustment of the timing paths.

19. The non-transitory computer-accessible memory medium of claim 18, wherein the program instructions are further executable to:
  adjust the timing paths in the hardware design until the predicted new path lengths meet desired constraints.

20. A system, comprising:
  a processor; and
  a memory medium, coupled to the processor, wherein the memory medium stores program instructions executable by a computer system to:
    receive a program representative of a hardware design implementing or more functions;
    produce a hardware implementation of the hardware design by running the received program through a compilation process that comprises multiple stages; as part of producing the hardware implementation:
      collect information relating to characteristics of the hardware design throughout the compilation process, wherein the characteristics of the hardware design include timing path information of the hardware design, wherein the hardware implementation of the hardware design does not meet at least one of the one or more constraints; and
    perform, until the one or more constraints are met:
      automatically adjust one or more stages of the compilation process prior to completion of the compilation process, based on the collected information via a programming interface, including automatically adjusting timing path implementation decisions, wherein to automatically adjust one or more stages of the compilation process prior to the completion of the compilation process, the program instructions are executable to:
        produce a timing report resulting from the compilation process, wherein the timing report comprises one or more failed timing constraint paths; and
        add one or more registers along at least one of the one or more failed timing constraint paths in order to improve the at least one timing path; and
      perform said producing via the adjusted compilation process;
    wherein to automatically adjust one or more stages of the compilation process, the program instructions are executable to:
    compare the timing report with a prior timing report obtained from a previous compilation process performed on the received program, wherein to compare the timing report with the prior timing report the program instructions are executable to:
      parse the one or more failed timing constraint paths in the timing report; and
      compare timing delays comprised in the failed timing constraint paths to timing delays comprised in corresponding timing constraint paths in the prior timing report; and
    adjust timing paths in the hardware design according to results of the comparison of the timing report with the prior timing report, wherein to adjust the timing paths the program instructions are executable to:
      find a longest preexisting component delay from the failed timing constraint paths; and
      add a register in a timing path corresponding to the found delay.

21. The system of claim 20, wherein to adjust timing path implementation decisions, the program instructions are further executable to:
  modify register placements for the purpose of adjusting timing paths in response to receiving input instructions via the programming interface, in order to improve the timing paths.

22. The system of claim 20, wherein the program instructions are further executable to:
  undo previous timing adjustments that didn't produce desired results, according to results of comparing the timing delays.

* * * * *